(12) United States Patent
Baker et al.

(10) Patent No.: US 11,348,181 B1
(45) Date of Patent: May 31, 2022

(54) METHOD AND SYSTEM FOR ASSESSING DRIVING RISKS BY DETECTING DRIVING ROUTINES

(71) Applicant: UIPCO, LLC, San Antonio, TX (US)

(72) Inventors: Kelly Q. Baker, San Antonio, TX (US); Sumita T. Jonak, San Antonio, TX (US); Will Kerns Maney, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

(21) Appl. No.: 16/424,638

(22) Filed: May 29, 2019

Related U.S. Application Data (60) Provisional application No. 62/753,111, filed on Oct. 31, 2018.

(51) Int. Cl.
| | |
|---|---|
| *G06Q 40/08* | (2012.01) |
| *G07C 5/00* | (2006.01) |
| *B60W 40/09* | (2012.01) |

(52) U.S. Cl.
CPC ............ *G06Q 40/08* (2013.01); *B60W 40/09* (2013.01); *G07C 5/008* (2013.01)

(58) Field of Classification Search
CPC ....... G06Q 40/08; B60W 40/09; G07C 5/008; G07C 5/085
See application file for complete search history.

(56) References Cited

U.S. PATENT DOCUMENTS

| | | | |
|---|---|---|---|
| 9,031,545 B1* | 5/2015 | Srey ................. | B60K 28/02 455/418 |
| 9,767,474 B1 | 9/2017 | Ramalingam et al. | |
| 9,805,601 B1* | 10/2017 | Fields ................. | G07C 5/02 |
| 10,493,994 B1* | 12/2019 | Fields ................. | G08G 1/0112 |
| 2007/0027726 A1* | 2/2007 | Warren ............... | G06Q 40/08 705/4 |
| 2010/0131302 A1* | 5/2010 | Collopy ............. | G06Q 30/0273 705/4 |
| 2014/0058761 A1* | 2/2014 | Freiberger ........... | G06Q 50/30 705/4 |
| 2014/0257869 A1* | 9/2014 | Binion ................. | B60C 1/00 705/4 |

(Continued)

FOREIGN PATENT DOCUMENTS

CN       108764111 A  * 11/2018

OTHER PUBLICATIONS

Merriam-Webster Dictionary, "Route" (Year: 2017).*

(Continued)

*Primary Examiner* — Elda G Milef
*Assistant Examiner* — James H Miller
(74) *Attorney, Agent, or Firm* — Plumsea Law Group, LLC (57) ABSTRACT

A system and method for automatically detecting if a vehicle safety system is being used by a driver is disclosed. The system and method use data gathered from one or more sensors in the vehicle. The data is analyzed to determine if the safety system is being used or disabled. The system can send reminders to a driver to use the safety system. The system and method can also automatically update a policy holder's insurance policy to reflect whether or not a safety system is being used.

15 Claims, 9 Drawing Sheets

(56) References Cited

U.S. PATENT DOCUMENTS

| | | | | |
|---|---|---|---|---|
| 2014/0310028 A1* | 10/2014 | Christensen | ........... | G06Q 40/00 |
| | | | | 705/4 |
| 2015/0046197 A1* | 2/2015 | Peng | ........... | G01W 1/00 |
| | | | | 705/4 |
| 2016/0189304 A1* | 6/2016 | Todasco | ........... | G06Q 40/08 |
| | | | | 705/4 |
| 2018/0213360 A1* | 7/2018 | Schmitt | ........... | G01C 21/18 |
| 2019/0102840 A1* | 4/2019 | Perl | ........... | B60W 40/09 |

OTHER PUBLICATIONS

Kaneko, Tetsuya, and Paul P. Jovanis. "Multiday driving patterns and motor carrier accident risk: a disaggregate analysis." Accident Analysis & Prevention 24, No. 5 (1992): 437-456. (Year: 1992).*

Leskovec, Jure, Anand Rajaraman, and Jeffrey David Ullman. "Mining of Massive Datasets." (2014). (Year: 2014).*

Kaneko, Tetsuya, et al. "Multiday Driving Patterns and Motor Carrier Accident Risk: Disaggregate Analysis," Jun. 1991 (Year: 1991 ).*

Kumar, N. Arun, et al. "Disruptive Technology for Auto Insurance Entrepreneurs, New Paradigm using Telematics and Machine Learning," 2017 (Year: 2017).*

Leskovec et al., Mining of Massive Datasets, 2014. (available at: http://infolab.stanford.edu/~ullman/mmds/book.pdf).

* cited by examiner

FIG. 9

METHOD AND SYSTEM FOR ASSESSING DRIVING RISKS BY DETECTING DRIVING ROUTINES

CROSS-REFERENCE TO RELATED APPLICATIONS

This application claims the benefit of Provisional Patent Application No. 62/753,111 filed Oct. 31, 2018, and titled "Method and System for Assessing Driving Risks By Detecting Driving Routines," which is incorporated by reference herein in its entirety.

TECHNICAL FIELD

The present disclosure generally relates to methods and systems for assessing driving risks for a driver, and in particular to assessing risks based on detecting driving routines from sensory information.

BACKGROUND

Vehicle owners are often required to have vehicle insurance in the event of damage or loss to the vehicle or its contents. To calculate a vehicle owner's insurance premium an insurance provider may consider a variety of factors. These can include the cost of the vehicle, the condition of the vehicle, the age of the vehicle and the driver's age. However, insurance providers lack additional information that, if known, could also affect the insurance premium. These include knowing driving trends, or driving routines, such as when and along what routes a vehicle is usually driven.

There is a need in the art for a system and method that addresses the shortcomings discussed above.

SUMMARY

In one aspect, a method of determining when a vehicle is operating and adjusting an insurance policy for the vehicle in response includes steps of, retrieving driving data, analyzing the driving data to identify a frequent driving period, determining an accident risk level associated with the frequent driving period, and adjusting the insurance policy according to the accident risk level.

In another aspect, a method of determining where a vehicle is operating and adjusting an insurance policy for the vehicle in response includes the steps of retrieving driving data, analyzing the driving data to identify a frequent driving route, determining an accident risk level associated with the frequent driving route, and automatically adjusting the insurance policy according to the accident risk level.

In another aspect, a method of retrieving and analyzing sensory information to determine a driving routine for a vehicle includes the steps of establishing communication with a mobile device associated with the vehicle, retrieving sensory information from a sensor of the mobile device, analyzing the sensory information to determine the driving routine for the vehicle.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide system and methods for automatically identifying driving routines for a vehicle. These can include frequent driving periods, which are the typical times a vehicle may be driven each day. These can also include frequent driving routes, which are the typical routes a vehicle may drive each day. The method includes retrieving sensory information from an onboard diagnostics system of the vehicle to determine when the vehicle is driven each day and along which routes it is driven. If the onboard diagnostics system does not provide this information, or if access to the onboard diagnostics system is not available, the method can include retrieving sensory information from a mobile device, such as a smartphone, to determine times a vehicle is driven as well as driving routes. The sensory information can be analyzed to determine frequent driving periods and/or frequent driving routes. The system and method can further be used to determine risk levels associated with the frequent driving periods and/or frequent driving routes. Based on the risk levels, the system and method can be used to automatically update an insurance policy associated with the vehicle. The system and method may also send a message to a policy holder indicating changes in the insurance policy. The message could be sent by text, email, a phone call and/or a push notification from an application supported by the provider.

By automatically identifying frequent driving times and/or frequent driving routes, the system and method can help an insurance provider to determine a more accurate value for an insurance premium. The system and method can also help improve customer satisfaction by automatically tracking driving routines and not requiring policy holders to manually track or guess at this information.

Figure 1:
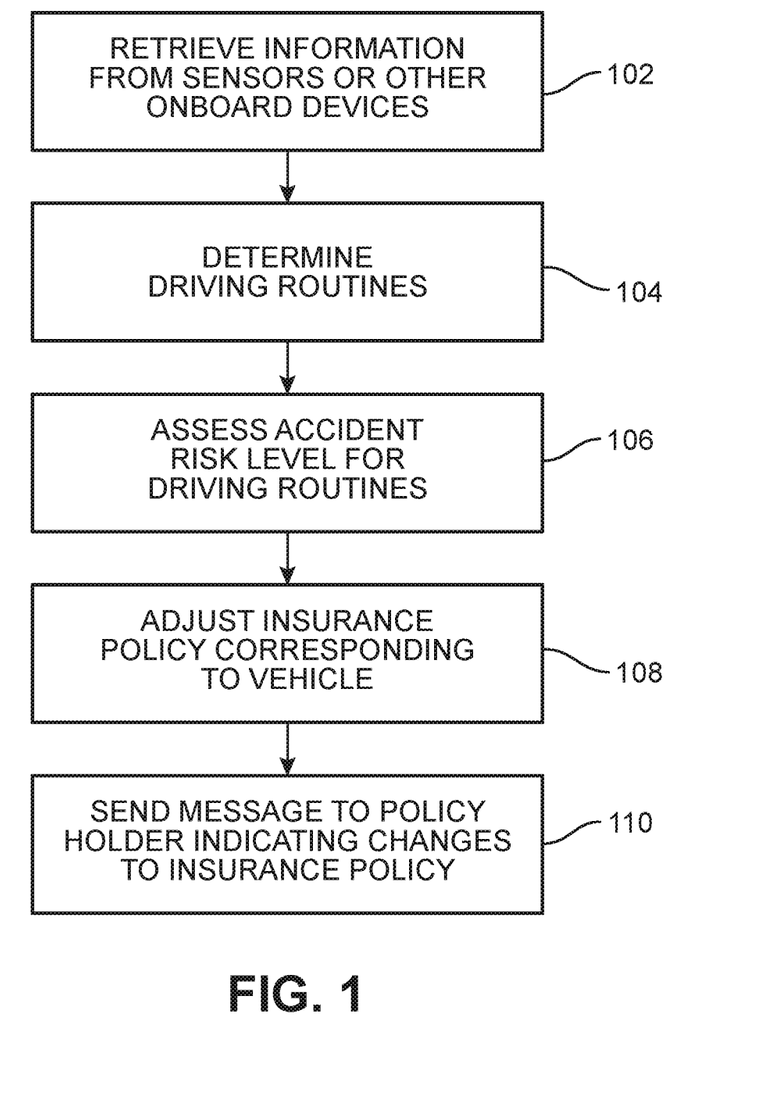
FIG. 1 is a schematic view of a process for determining driving routines for a vehicle and taking actions in response to the driving routines, according to an embodiment.

FIG. 1 is a schematic view of a process for adjusting an insurance policy for a vehicle, and sending messages to indicate any adjustments, based on detected driving routines. In the present embodiment, one or more of the steps in this process may be performed by an insurance provider. The term "insurance provider" (or simply "provider"), as used herein refers to any institutions or companies that provide insurance products. Insurance products can include home owner's insurance, renter's insurance, commercial property insurance, and vehicle insurance. An insurance product may be characterized by an insurance policy, which is a contract between an insurance provider (the "insurer") and a policy holder (the "insured"). In cases where vehicle insurance is provided, the policy holder may be an owner, or driver, of a vehicle. The policy holder may also be referred to as a customer of the insurance provider.

In step 102, a provider may retrieve information from one or more sensors, a mobile device, and/or from another onboard device, such as an onboard diagnostic system. As discussed in further detail below, the sensors could be associated with a vehicle, or with a user device disposed within the vehicle. The type of sensors could vary, and may generally include optical based sensors (for example, cameras), audible based sensors, haptic or motion based sensors, gyroscopes, accelerometers, wheel speed sensors, GPS receivers, as well as other suitable sensors. Information could be retrieved directly from the sensors, or may be retrieved through the vehicle's onboard diagnostics system (OBD), which may monitor some, or all, of a vehicle's onboard sensors. For sensors in a mobile device, sensory information could be retrieved through the mobile device using, for example, an application programming interface (API).

Next, in step 104, the information from the one or more sensors may be used to determine driving routines. As used herein, the term "driving routine" refers to any kind of common driving behavior. Driving routines can include typical periods of time when a vehicle is driven. For example, drivers who primarily use their vehicle to drive to and from work may tend to drive during the same times each morning and evening, at least on weekdays. Driving routines can also include typical routes driven, as well as areas where a vehicle is commonly driven (such as in a particular city or county). For example, drivers who primarily use their vehicle to drive to and from work may tend to drive along the same routes each morning and evening, at least one weekdays.

In step 106, the provider may assess an accident risk level for the identified driving routines. For example, if the vehicle is frequently driven during rush hour, the provider may assess a higher accident risk level to the vehicle than if the vehicle is not frequently driven during rush hour. Similarly, if the vehicle is frequently driven along routes where accidents rates are relatively high, the provider may assess a higher accident risk level to the vehicle than if the vehicle is most frequently driven along routes with relatively low accident rates. For example, a vehicle driven each day along a beltway outside of a major city may be assessed a higher risk level than a vehicle driven each day along a small rural highway.

In step 108, the provider may automatically adjust the insurance policy corresponding to the vehicle to reflect the assessed risk levels for the detected driving routines. Specifically, in cases where software running on a computer is used to perform some, or all, of the above steps, the same software can also automatically update an insurance policy. Here, updating the insurance policy may include updating the insurance premium and/or deductible paid by the policy holder.

In step 110, the provider may automatically send a message to the policy holder indicating the changes made to the insurance policy during step 108. For example, a policy holder whose vehicle is driven on higher risk routes or at higher risk times may be informed that their insurance premium has been slightly increased. As another example, a policy holder whose vehicle is driven on lower risk routes or at lower risk times may be informed that their insurance premium has been slightly reduced.

Figure 2:
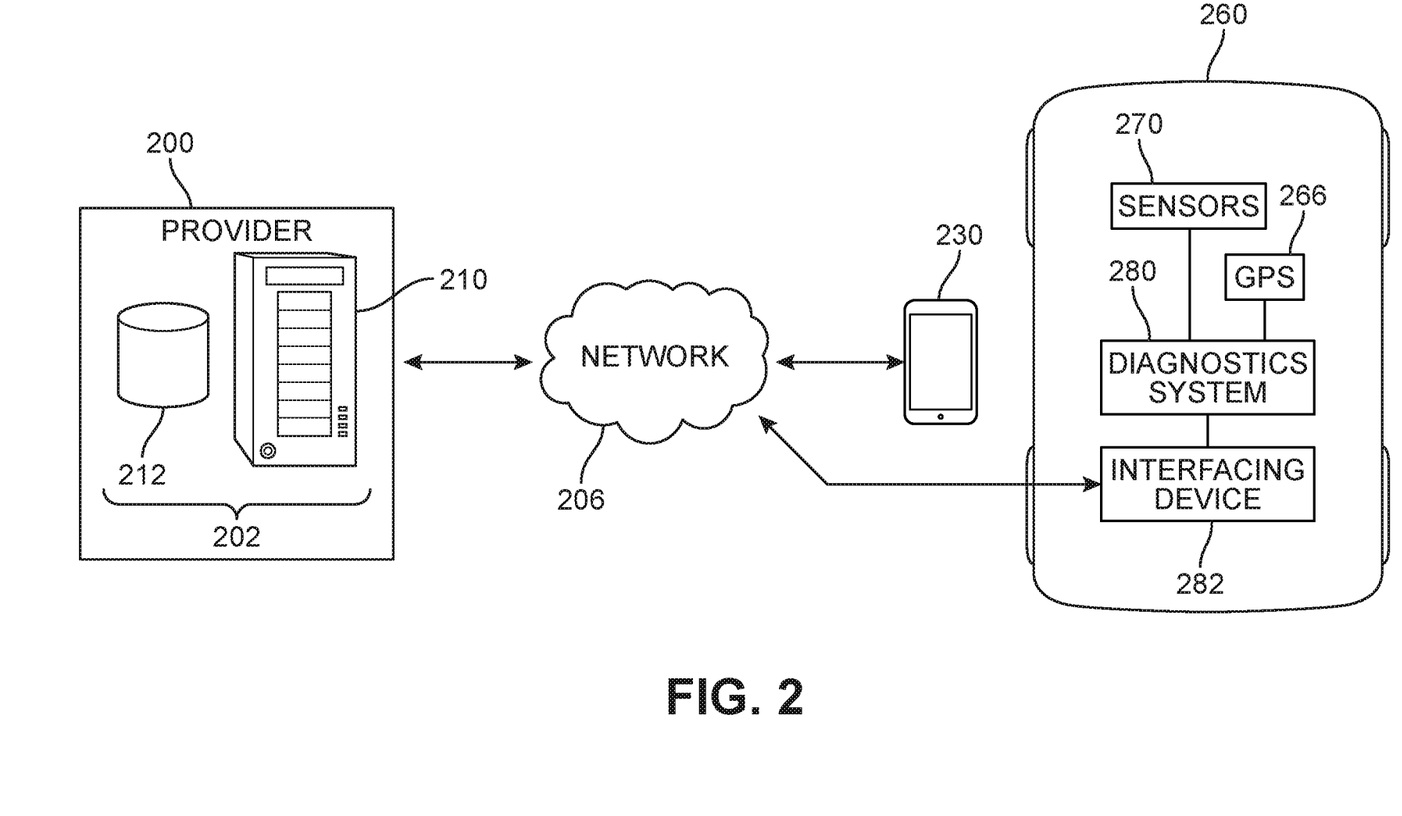
FIG. 2 is a schematic view of a system for receiving sensed information and analyzing the information to determine driving routines and take action according to the driving routines, according to an embodiment.

FIG. 2 is a schematic view of many of the systems and devices that may be used to extract and process sensory data from a vehicle or other device. Referring to FIG. 2, provider 200 may comprise a centralized computing system 202. The term "computing system" refers to the computing resources of a single computer, the partial computing resources of a single computer, a plurality of computers communicating with one another, or a network of remote servers. In an exemplary embodiment, computing system 202 includes at least one server.

In the embodiment of FIG. 2, centralized computing system 202 comprises one or more computing devices 210 (for example, a server) that may be in communication with one or more databases 212. Computing device 210 may include one or more processors and a non-transitory computer readable medium. Instructions stored on the non-transitory computer readable medium may be executed by the one or more processors. Databases 212 could be co-located with computing device 210 or could be remote databases that are accessible by computing device 210 over network 206. Databases 212 can include any kind of storage devices, including but not limited magnetic, optical, magneto-optical, and/or memory, including volatile memory and non-volatile memory.

In some embodiments, information from a plurality of sensors 270 disposed in or on a vehicle may only be accessible through a diagnostics system 280 of vehicle 260. Diagnostics system 280 may be associated with on-board diagnostics (OBD) capabilities. In some cases, diagnostics system 280 may comprise part of an onboard computing system of vehicle 260.

To access diagnostics system 280, some embodiments may include an interfacing device 282. Interfacing device 282 may include any device that can interface with diagnostics system 280 and also communicate with computing device 202 over a network, or wired connection. Interfacing device 282 could communicate with diagnostics system 280 using various interfacing protocols and hardware. Exemplary interfaces include OBD-I, OBD-1.5, and OBD-II. Interfacing devices can comprise hand-held scan tools, mobile device-based tools, PC-based scan tools, data loggers and telematics devices.

In one embodiment, interfacing device 282 is a telematics device. The term "telematics device" refers to any device that can plugged into an interfacing port (for example, an OBD-II port) on a vehicle and used to track information from sensors and/or other onboard systems. In some embodiments, a telematics device may be configured to wirelessly communicate with other computing devices. In other embodiments, a telematics device may track and store information that can be accessed at a later time by removing the device and plugging it into another computing device (for example, using a USB cord).

In some embodiments, location information for a vehicle can also be retrieved using interfacing device 282. In the example of FIG. 2, vehicle 260 includes an onboard GPS receiver 266 that can receive GPS information. This information can be accessed by interfacing device 282 via diagnostics system 280. In other embodiments, GPS information, or any other location or navigation information, can be retrieved from any other suitable devices in a vehicle.

Provider 200 can retrieve various kinds of real time or tracked sensory information associated with vehicle 260 via communication with interfacing device 282. In some embodiments, this communication occurs over network 206. In other embodiments, interfacing device 282 could be a removable telematics device that can be unplugged from diagnostics system 280 and physically plugged into a device associated with computing system 202.

Provider 200 could also communicate with a user device 230, which may be carried in, or adjacent to, vehicle 260. User device 230 may comprise a computing system for processing and communicating information. A user device may generally include a processor, a data storage component, and a display. A user device may also include components to facilitate communication with external systems (for example, hardware and software components to enable communication over network 206). In some cases, a user device includes one or more physical buttons. In some cases, a user device includes touchscreen controls. Additionally, user device 230 could include additional sensors including, but not limited to: accelerometers, gyroscopes, magnetometers, GPS receivers, barometers, proximity sensors and ambient light sensors.

In the exemplary embodiment of FIG. 2, user device 230 comprises a mobile device. Specifically, user device 230 comprises smartphone. In other embodiments, user device 230 could be a tablet computing device. In still other embodiments, however, a user device could comprise a laptop, a desktop computer, or similar kind of device.

Any of the devices described above may be configured to operate in a client-server relationship with computing system 202 of provider 200. For example, computing system 202 may include a server that communicates with interfacing device 282 over network 206. Computing system 202 could also communicate with sensors or local computing devices that are themselves connected to sensors. Information from these various devices may be sent to computing system 202 for analysis and/or storing data.

In some embodiments, user device 230 may run client software to control one or more sensors of the device, retrieve sensory information, store sensory information and/or send sensory information to computing system 202 for analysis. In addition, messages may be automatically sent to user device 230 to inform a user of changes to their policy and/or to request further action regarding their policy.

Figure 3:
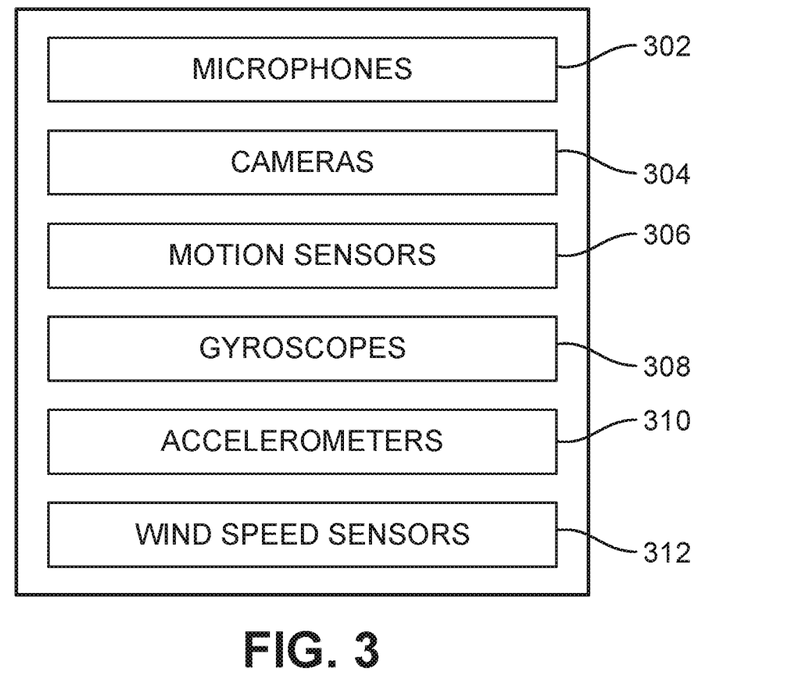
FIG. 3 is a schematic view of various sensors that could be used with the exemplary system of FIG. 2.

FIG. 3 is a schematic view of various kinds of sensors that could be associated with either vehicle 260 or user device 230. It may be appreciated that different sensors can be used with each device and a single device need not include all of the following sensors. For example, user device 230 would not include wheel speed sensors 312 depicted in FIG. 3.

Microphones 302 could include any kind of microphones known in the art for use in vehicles or mobile devices. User device 230 may include microphones. In addition, vehicle 260 could include microphones embedded in a dashboard, in a rearview mirror or other locations. Such microphones may be useful for speakerphone functionality and for communicating audibly with an onboard intelligent voice assistant.

Cameras 304 could include any kind of cameras known in the art for use in vehicles or mobile devices. User device 230 may include one or more cameras. In addition, vehicle 260 could include cameras in a dashboard or rearview mirror, for example.

Motion sensors 312 could comprise any kinds of motions sensors known in the art. These may include, but are not limited to: passive infrared sensors, microwave sensors, and ultrasonic sensors. Motion sensors could be deployed at selective locations in a vehicle and/or user device.

Gyroscopes 308 could comprise any kind of sensors for measuring orientation and angular velocity. These may include, but are not limited to mechano-electrical systems (MEMS) gyroscopes, solid-state gyroscopes and fibre-optic gyroscopes.

Accelerometers 310 could comprise any kinds of sensors for measuring acceleration. These may include mechano-electrical systems (MEMS) accelerometers, piezo-resistive accelerometers, and piezoelectric accelerometers.

Wheel speed sensors 312 could include any sensors known in the art for measuring the speed of a wheel's rotation. These may include magnetic inductive (passive) wheel speed sensors and magneto-resistive (active) wheel speed sensors.

In addition, in some embodiments a diagnostic system may also track additional kinds of driving information that may be available to a provider through an interfacing device. These can include, but are not limited to: engine status (that is "on" or "off"), braking information (for example, one or more breaks are active), vehicle safety system information (for example, when airbags are deployed) as well as other kinds of driving information.

Figure 4:
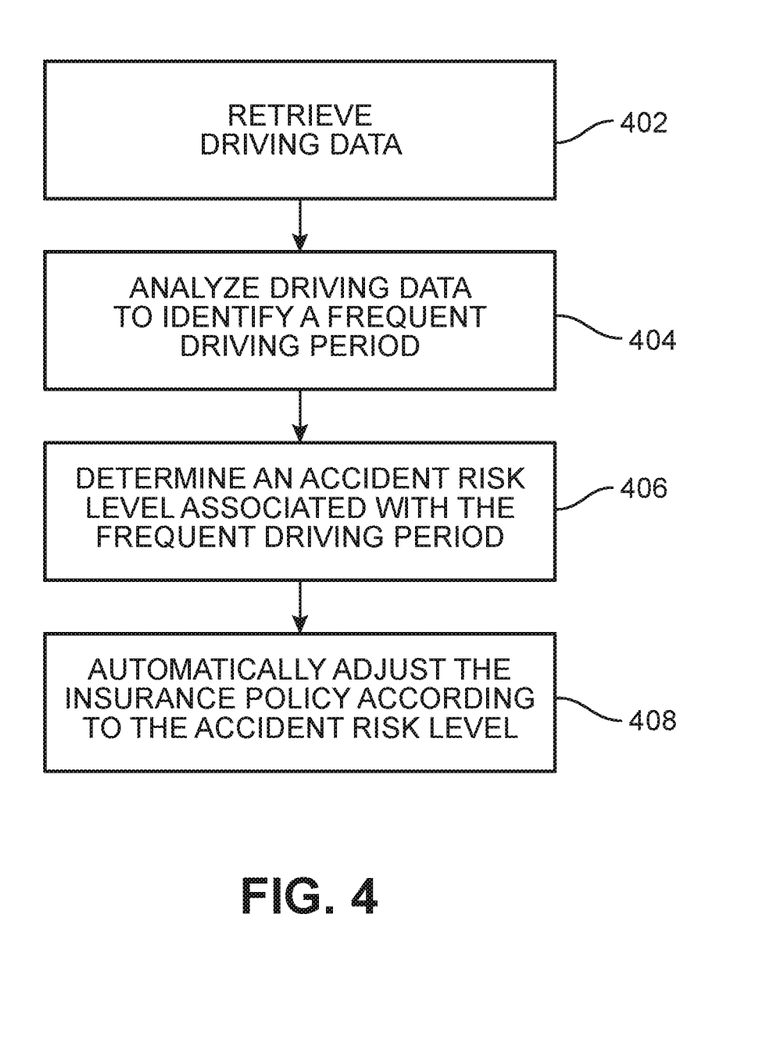
FIG. 4 is a schematic view of a process for determining driving routines and adjusting an insurance policy, according to an embodiment.

FIG. 4 is a schematic process for detecting frequent driving periods for a vehicle and updating an insurance policy for the vehicle accordingly. For convenience, the following steps are described as being performed by a computing system operated by provider (e.g., provider 200 in FIG. 2). However, it may be appreciated that some of these steps can be performed by one or more systems operated by another entity. In one embodiment, the following steps can be performed by software running on a computing system (e.g., computing system 202) that is maintained by a provider (e.g., provider 200).

In step 402, the computing system may retrieve driving data. The term "driving data" as used herein refers to any data related to operation of a vehicle. Driving data can include both sensed driving data, as well as other kinds of data that may not be directly sensed. In some cases, driving data includes sensed information such as vehicle speed information and vehicle location information. In some cases, this data is provided as time series data, giving the vehicle speed and/or location and regular intervals of time. Here regular intervals could comprise any measurable interval, including a microsecond, a millisecond, a second as well as any other interval, and may generally depend on the types of sensors used.

Figure 5:
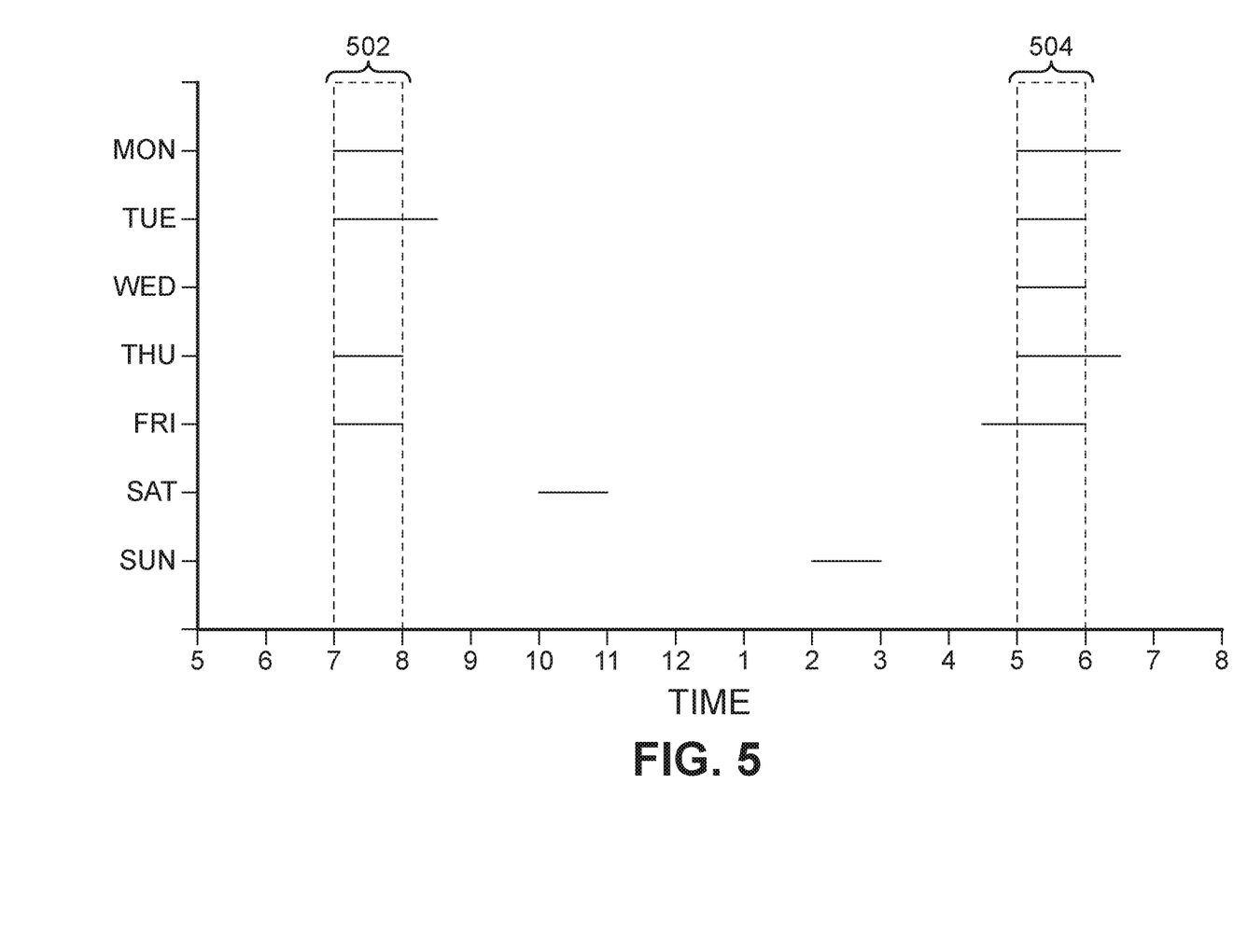
FIG. 5 is a schematic view of a chart depicting frequent driving periods, according to an embodiment.

In step 404, the computing system may analyze the driving data to identify one or more frequent driving periods. As described above, a frequent driving period is a period of time when a vehicle is more frequently driven relative to other periods of time. For clarity, FIG. 5 depicts an example in which sample driving data for a single week is analyzed to identify multiple frequent driving periods. Referring to FIG. 5, driving data for one week includes driving periods for each day. For example, data corresponding to Monday indicates that the vehicle was driven from 7 am to 8 am and then again from 5 pm to 7 pm. Each of the following days also includes the measured periods of time when the vehicle was driven. For example, on Tuesday, the vehicle was driven from 7 am to 8:30 am, and then again from 5 pm to 6 pm.

From the data shown in FIG. 5, two frequent driving periods can be identified. Specifically, a first frequent driving period 502 is a period between 7 am and 8 am. A second frequent driving period 504 is a period between 5 pm and 6 pm. These correspond to periods of time when a vehicle is driven on most, though not necessarily all, days.

In different embodiments, a frequent driving period could be calculated in different ways. In some cases, a frequent driving period could be calculated as an average, or weighted average, of the driving periods for multiple days. In other cases, a frequent driving period could be calculated as any driving period that occurs more than a predetermined number of times. For example, in one embodiment, a frequent driving period could be any period of driving time that occurs more than once over multiple days. In another embodiment, a frequent driving period could be any period of driving time that occurs more than twice over multiple days.

In another embodiment, frequent driving periods can be determined using any known machine learning algorithms. For example, a clustering analysis could be used to extract frequent driving periods from the driving data without providing explicit rules defining a frequent driving period ahead of time.

Frequent driving periods could be calculated over any interval of days. A suitable interval may be selected according to the frequency with which a provider wants to reassess a driver's routines. For example, if a provider wishes to reevaluate driving routines every six months, the corresponding interval could be six months worth of driving data. Moreover, an algorithm used to determine frequent driving periods could be configured to exclude certain driving days like weekends or holidays, when driving patterns may not be as regular as they are during the week.

Any kind of suitable sensed data could be used to determine times when a vehicle has been driven. In embodiments where engine status (on/off) is tracked by an onboard diagnostics system, the times when a vehicle is driven may be readily inferred from this data. In other embodiments, however, wheel speed information from wheel speed sensors and/or acceleration information from an accelerometer could also be used to infer times when a vehicle has been driven. Moreover, acceleration information could be retrieved either from an onboard vehicle sensor or from a sensor in a mobile device.

Next, in step 406, a computing system can determine an accident risk level associated with the one or more frequent driving periods identified in step 404. An accident risk level may be a number indicating how risky it is to drive during a given period of time relative to other periods of time. For example, periods of time corresponding to rush hour may be assessed a higher accident risk level compared to periods of time corresponding to midday when fewer vehicles are on the road. As another example, periods of time in the middle of the night may be assessed a higher accident risk level than periods of time in the late morning, since drivers may be more likely to fall asleep at the wheel when driving in the middle of the night compared to late morning.

In step 408, a computing system may automatically adjust an insurance policy and/or records associated with an insurance policy, according to the accident risk level evaluated in step 406. In some cases, a computing system could automatically adjust a premium or deductible for the insurance policy to reflect the updated risk assessment for the vehicle.

In other cases, a computing system could update records associated with the insurance policy to indicate accident risk levels. This information may not be used to immediately adjust insurance premiums or deductibles, but could be saved for later reference.

Figure 6:
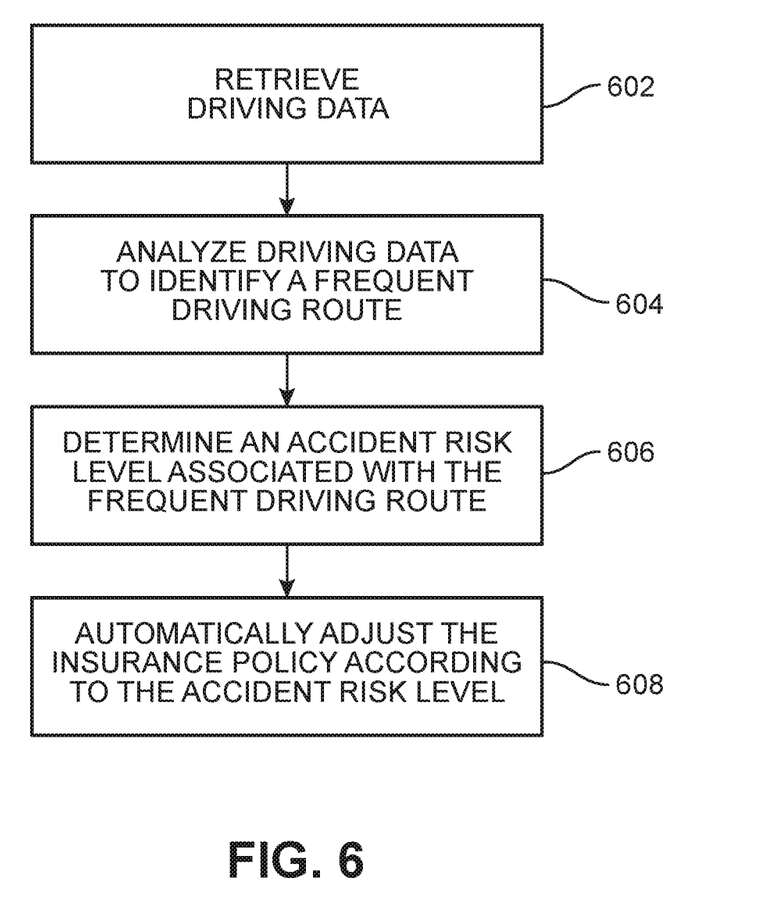
FIG. 6 is a schematic view of a process for determining driving routines and adjusting an insurance policy, according to an embodiment.

FIG. 6 is a schematic process for detecting frequent driving routes for a vehicle and updating an insurance policy for the vehicle accordingly. For convenience, the following steps are described as being performed by a computing system operated by provider (e.g., provider 200 in FIG. 2). However, it may be appreciated that some of these steps can be performed by one or more systems operated by another entity. In one embodiment, the following steps can be performed by software running on a computing system (e.g., computing system 202) that is maintained by a provider (e.g., provider 200).

Figure 7:
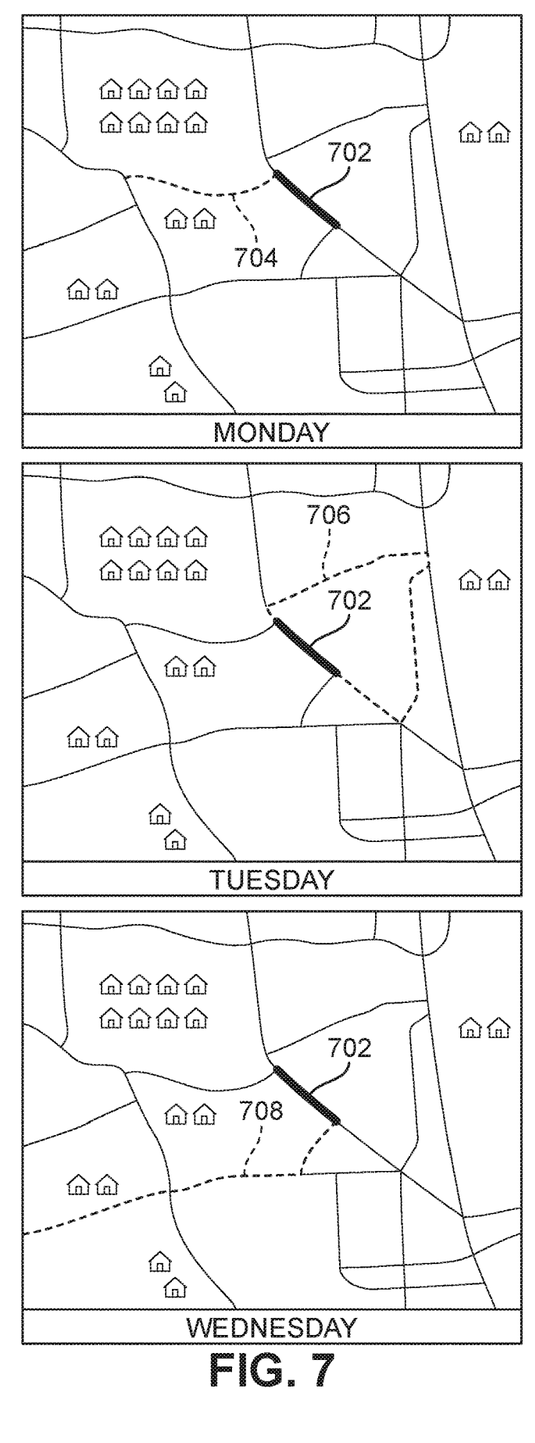
FIG. 7 is a schematic view of a chart depicting frequent driving routes, according to an embodiment.

In step 602, the computing system may retrieve driving data. Driving data could be retrieved from an onboard diagnostics system, directly from vehicle sensors, or from a mobile device such as a smartphone disposed in the vehicle. In step 604, the computing system may analyze the driving data to identify one or more frequent driving routes. As described above, a frequent driving route is a route that a vehicle travels along more frequently relative to other routes. For clarity, FIG. 7 depicts an example in which sample driving data for several days is analyzed to identify a frequent driving route. For clarity, data for only three days is shown in FIG. 7, however it should be appreciated that data for any number of days could be used.

Referring to FIG. 7, driving data for one week includes driving routes for each day. For example, data corresponding to Monday indicates that the vehicle drove along a first route 702 and then along a second route 704. Likewise, data corresponding to Tuesday indicates that the vehicle drove along first route 702 and then along a third route 706. Data corresponding to Wednesday indicates that the vehicle drove along first route 702 and then along a fourth route 708.

From the data shown in FIG. 7, first route 702 can be identified as a frequent driving route, since the vehicle traveled on first route 702 on all three days, but did not travel on any other routes on more than a single day.

In different embodiments, a frequent driving route could be calculated in different ways. In some cases, a frequent driving period could be calculated as an average, or weighted average, of the driving routes for multiple days. In other cases, a frequent driving period could be calculated as any driving route that occurs more than a predetermined number of times. For example, in one embodiment, a frequent driving route could be any route that occurs more than once over multiple days. In another embodiment, a frequent driving route could be any route that occurs more than twice over multiple days.

In another embodiment, frequent driving routes can be determined using any known machine learning algorithms. For example, a clustering analysis could be used to extract frequent driving routes from the driving data without providing explicit rules defining a frequent driving route ahead of time.

Frequent driving routes could be calculated over any interval of days. A suitable interval may be selected according to the frequency with which a provider wants to reassess a driver's routines. For example, if a provider wishes to reevaluate driving routines every six months, the corresponding interval could be six months worth of driving data. Moreover, an algorithm used to determine frequent driving routes could be configured to exclude certain driving days like weekends or holidays, when driving patterns may not be as regular as they are during the week.

Any kind of suitable sensed data could be used to determine routes where a vehicle has been driven. In some embodiments, GPS or other location information can be used to track a vehicle's location over time. In other embodiments, sensed information from accelerometers, a gyroscope and/or wheel speed sensors could be used to deduce a vehicle's location over time. Moreover, information from any of these sensors (except wheel speed sensors) could be retrieved either from an onboard vehicle sensor or from a sensor in a mobile device.

Next, in step 606, a computing system can determine an accident risk level associated with the one or more frequent driving routes identified in step 604. An accident risk level may be a number indicating how risky it is to drive along a given route relative to other routes. For example, routes corresponding to high density traffic areas may be assessed a higher accident risk level compared to routes corresponding to low density traffic areas. As another example, routes corresponding to rough terrain, including mountain roads or dirt roads, could be assessed a higher accident risk level compares to routes corresponding to smooth terrain like paved roads and long flat stretches of highway.

In step 608, a computing system may automatically adjust an insurance policy and/or records associated with an insurance policy, according to the accident risk level evaluated in step 606. In some cases, a computing system could automatically adjust a premium or deductible for the insurance policy to reflect the updated risk assessment for the vehicle. In other cases, a computing system could update records associated with the insurance policy to indicate accident risk levels. This information may not be used to immediately adjust insurance premiums or deductibles, but could be saved for later reference.

Figure 8:
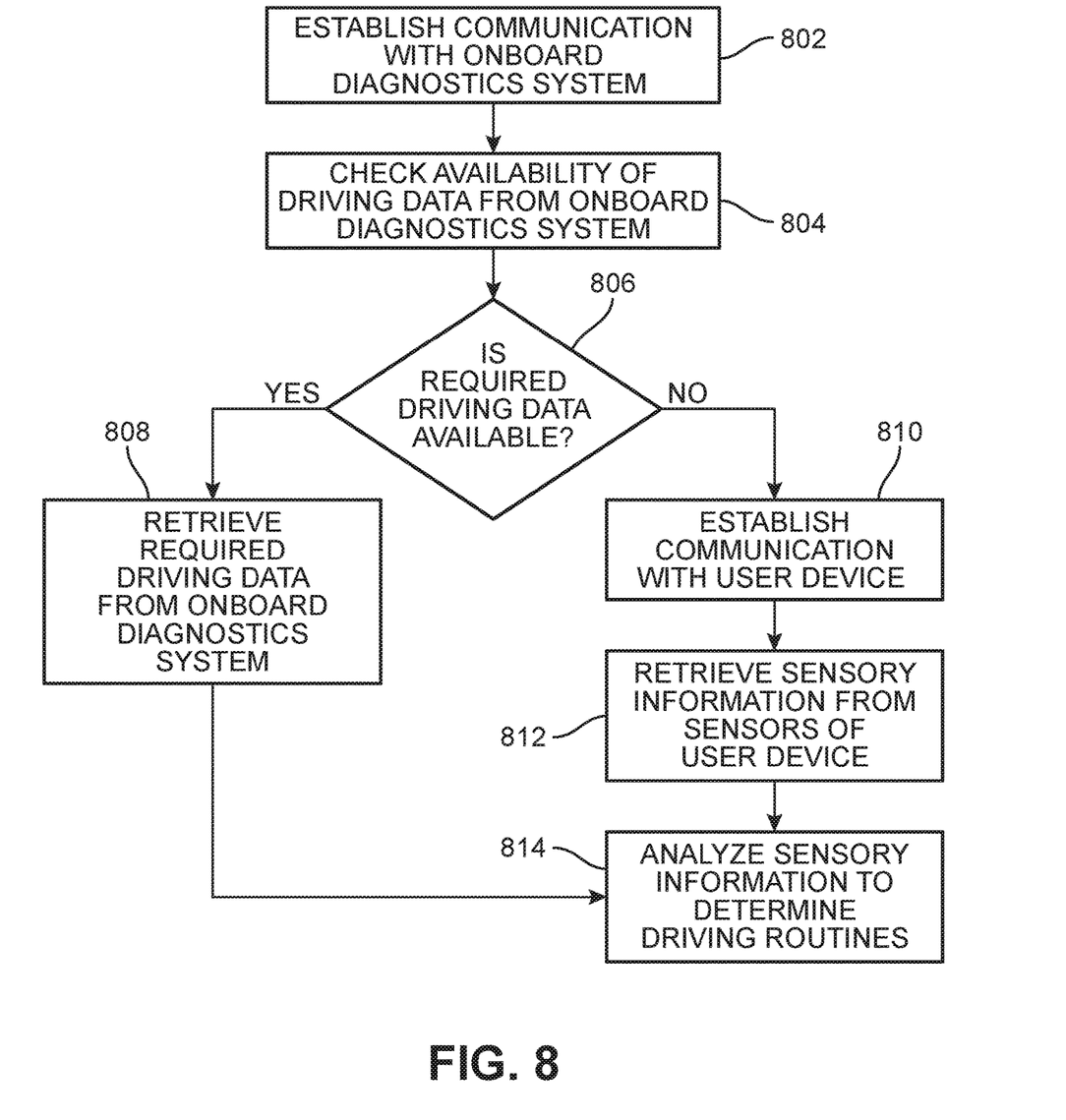
FIG. 8 is a schematic view of a method of selecting a source ofسensory information, according to an embodiment.

FIG. 8 is a schematic view of a process for retrieving sensory information according to its availability from either sensors associated with a vehicle or sensors associated with a mobile device such as a smartphone. Referring to FIG. 8, in step 802 a computing system may establish a connection with an onboard diagnostics system (such as onboard diagnostics system 280) of a vehicle. The computing system may then check the availability of the required driving data from the onboard diagnostics system at step 804. In this case, required driving data includes any data from which driving times and/or driving routes can be inferred.

If the computing system determines that the required data is available from the onboard diagnostics system at step 806, the computing system proceeds to step 808 to retrieve the required information.

If the computing system determines that the required information is not available from the onboard diagnostics system at step 806, the computing system proceeds to step 808. In step 808, the computing system may establish communication with a user device (for example, user device 230). Next, in step 812, the computing system may retrieve sensory information from one or more sensors of the user device. This could include acceleration information for regular time intervals, from which the computing system could infer when a vehicle was moving, and thus driving periods. Additionally, this could include GPS or other location information for regular time intervals, from which the computing system could infer driving routes.

After obtaining the necessary sensory information at either step 808 or step 812, the computing system may proceed to step 814. At step 814, the computing system may analyze the sensory information to determine driving routines, including frequent driving periods and/or frequent driving routes.

Because a mobile device is unlikely to always be disposed in a vehicle, a system can include provisions for retrieving data that overlaps with times when the mobile device is in the vehicle. To determine such times, an exemplary system could look at vehicle speed (as determined via accelerometer information) to find times when the mobile device was moving at speeds consistent with a vehicle, such as a car. An exemplary system could also look at location information over time and determine when the mobile device has traveled a substantially far distance in a relatively short period of time, which may also be consistent with a mobile device being transported in a vehicle. Additionally, in some cases, a provider's computing system could detect other information signaling that a mobile device is in a vehicle. For example, a system could detect communication between a mobile device and an onboard computer of the vehicle.

Figure 9:
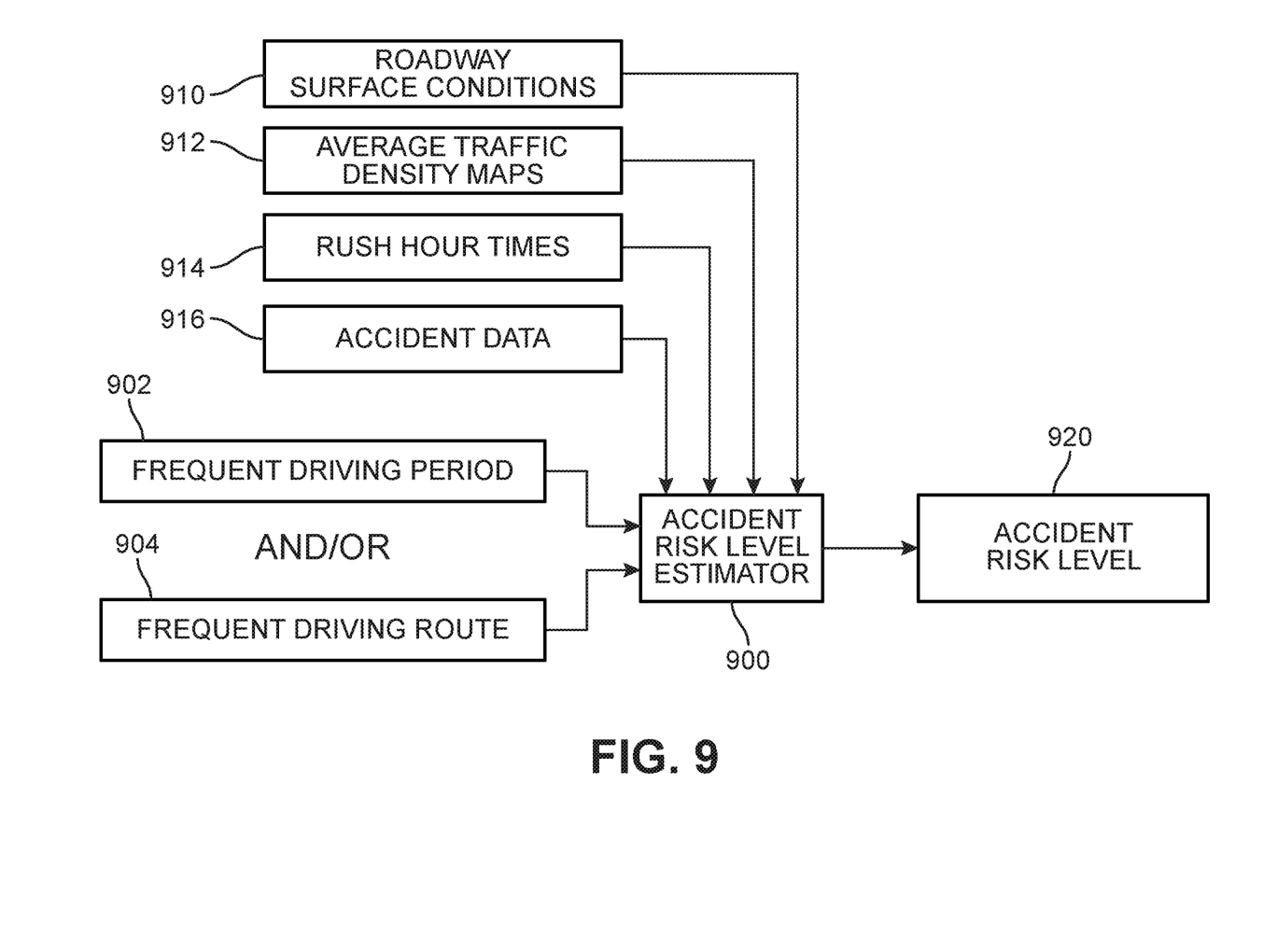
FIG. 9 is a schematic view of a system for assessing accident risk levels to driving routines.

FIG. 9 is a schematic view of an embodiment of an accident risk level estimator 900. Accident risk level estimator 900, also referred to simply as estimator 900, may comprise any algorithm or software process for assigning an accident risk level 920 to a frequent driving period 902 and/or frequent driving route 904. To estimate a risk level for driving periods and/or driving routes, estimator 900 may use various other kinds of data relevant to the risk of driving during certain times and/or along certain routes. These data can include, but are not limited to, roadway surface conditions 910, average traffic density maps 912, rush hour times 914 and accident data 916.

Accident risk level estimator 900 can utilize any suitable algorithms for assessing a risk level. In some embodiments, accident risk level estimator can use a machine learning algorithm to predict risk levels based on frequent driving period and/or frequent driving route.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of determining when and where a vehicle is operating and adjusting an insurance policy for the vehicle in response, the method comprising the following steps performed by execution of instructions stored on a non-transitory computer readable medium by a device processor:
   performing a check for the availability of driving data from an onboard diagnostics system of the vehicle;
   if a predetermined set of driving data is not available, retrieving driving data including sensory information from a mobile device disposed in the vehicle;
   utilizing machine learning including a clustering analysis to analyze the driving data to identify a frequent driving period independent of any explicit rules defining the frequent driving period ahead of time, and to identify a frequent driving route independent of any explicit rules defining the frequent driving route ahead of time;
   determining an accident risk level associated with the frequent driving period and the frequent driving route; and
   adjusting the insurance policy according to the accident risk level;
   wherein retrieving driving data includes automatically retrieving the sensory information corresponding to times when the mobile device is disposed inside the vehicle.

2. The method according to claim 1, wherein the mobile device is a smartphone.

3. The method according to claim 1, wherein adjusting the insurance policy includes adjusting an insurance premium of the insurance policy.

4. The method according to claim 1, wherein the driving data includes information about periods of time when the vehicle was driven.

5. A method of determining where and when a vehicle is operating and adjusting an insurance policy for the vehicle in response, the method comprising the following steps performed by execution of instructions stored on a non-transitory computer readable medium by a device processor:
   performing a check for the availability of driving data from an onboard diagnostics system of the vehicle;
   if a predetermined set of driving data is not available, retrieving driving data including sensory information from a mobile device disposed in the vehicle;
   utilizing machine learning including a clustering analysis to analyze the driving data to identify a frequent driving route independent of any explicit rules defining the frequent driving route ahead of time and to identify a frequent driving period independent of any explicit rules defining the frequent driving period ahead of time;
   determining an accident risk level associated with the frequent driving route and the frequent driving period; and
   automatically adjusting the insurance policy according to the accident risk level;
   wherein retrieving driving data includes determining when the mobile device is disposed inside the vehicle by monitoring at least one of acceleration, speed, and location of the mobile device or detecting communication between the mobile device and an onboard computer of the vehicle; and automatically retrieving the sensory information corresponding to times when the mobile device is disposed inside the vehicle.

6. The method according to claim 5, wherein the mobile device is a smartphone.

7. The method according to claim 5, wherein adjusting the insurance policy includes adjusting an insurance premium of the insurance policy.

8. The method according to claim 5, wherein the driving data includes location information for the vehicle for multiple intervals of time.

9. The method according to claim 8, wherein analyzing the driving data includes determining driving routes that the vehicle has taken.

10. A method of retrieving and analyzing sensory information to determine a driving routine for a vehicle, the driving routine including a frequent driving route and a frequent driving period, the method comprising the following steps performed by execution of instructions stored on a non-transitory computer readable medium by a device processor:

establishing communication with a mobile device associated with the vehicle;

performing a check for the availability of driving data from an onboard diagnostics system of the vehicle;

if a predetermined set of driving data is not available, retrieving driving data including sensory information from a sensor of the mobile device; and utilizing machine learning including a clustering analysis to analyze the sensory information to determine the driving routine for the vehicle independent of any explicit rules defining the driving routine ahead of time;

wherein the sensory information is received during periods corresponding to times when the mobile device is disposed inside the vehicle.

11. The method according to claim 10, wherein the mobile device is a smartphone.

12. The method according to claim 10, wherein the driving data includes acceleration information for multiple intervals of time.

13. The method according to claim 10, wherein the driving data includes location information for multiple intervals of time.

14. The method according to claim 10, further including determining when the mobile device is disposed inside the vehicle by monitoring at least one of acceleration, speed, and location of the mobile device.

15. The method according to claim 10, further including determining when the mobile device is disposed inside the vehicle by detecting communication between the mobile device and an onboard computer of the vehicle.

* * * * *